United States Patent [19]

Kubo

[11] Patent Number: 4,821,703

[45] Date of Patent: Apr. 18, 1989

[54] OPENING METHOD FOR REINFORCED CONCRETE WALL

[75] Inventor: Setsuo Kubo, Kyoto, Japan

[73] Assignee: Kabushiki Kaisha Dymosha, Kyoto, Japan

[21] Appl. No.: 78,884

[22] Filed: Jul. 29, 1987

[30] Foreign Application Priority Data

Aug. 31, 1986 [JP] Japan ................... 61-204851

[51] Int. Cl.$^4$ ............................................. B28D 1/00
[52] U.S. Cl. .......................................... 125/1; 125/21; 299/15; 175/73
[58] Field of Search ................. 125/1, 21; 299/15; 175/73, 172

[56] References Cited

U.S. PATENT DOCUMENTS

| 454,712 | 6/1891 | Clark | 299/15 |
|---|---|---|---|
| 1,313,269 | 8/1919 | Custer | 125/21 |
| 2,674,238 | 4/1954 | Dessureau et al. | 125/21 |
| 2,808,045 | 10/1957 | Cherreau | 125/21 |
| 4,633,848 | 1/1987 | Bresciani | 125/21 |

Primary Examiner—Frederick R. Schmidt
Assistant Examiner—Shirish Desai
Attorney, Agent, or Firm—Fidelman & Wolffe

[57] ABSTRACT

The opening method to drill openings with required largeness on thick reinforced concrete walls such as a reinforced concrete dam body is presented.

This method comprises (1) the process of drilling cable penetrations in the depth direction on each corner around the opening domain on a reinforced concrete wall, (2) the process of penetrating cutting cable through cable penetrations and to carry out wire sawing with water injection, (3) the process to break and remove the separated core.

According to this method, the required opening for thick reinforced concrete walls such as a reinforced concrete dam body which has been regarded as difficult if not impossible, can be safely and exactly drilled with the smallest number of processes, having no bad influence on the surrounded wall.

2 Claims, 4 Drawing Sheets

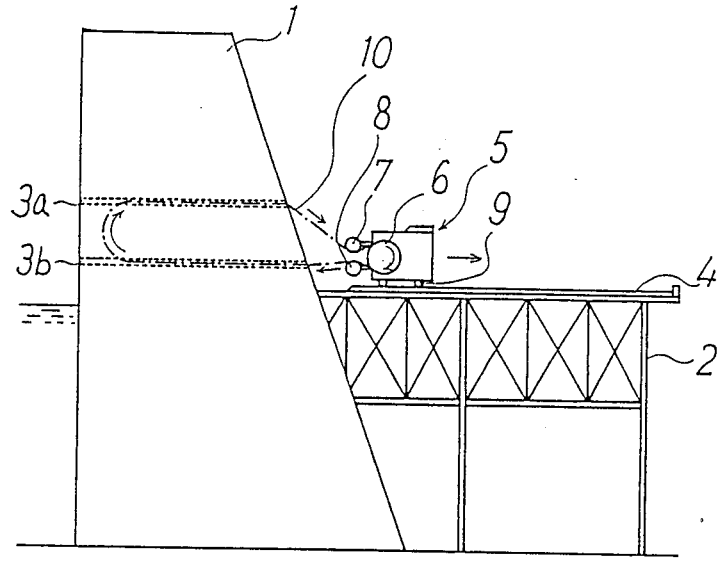
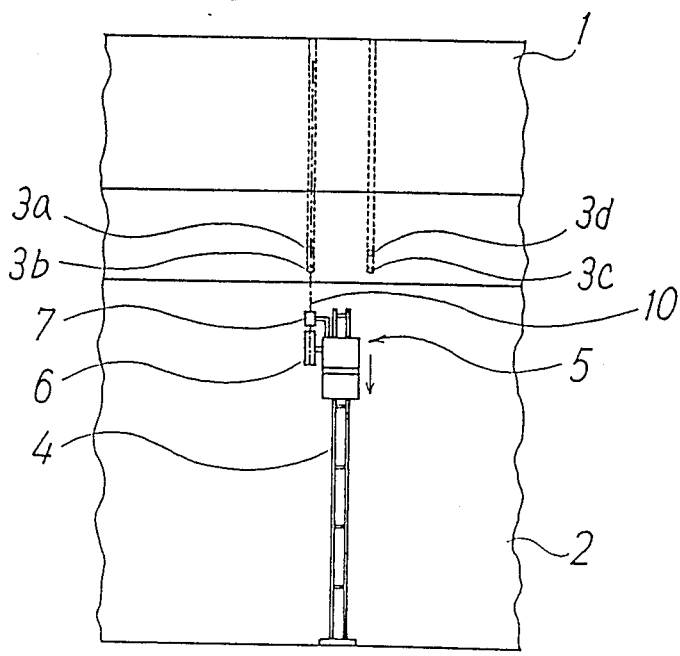

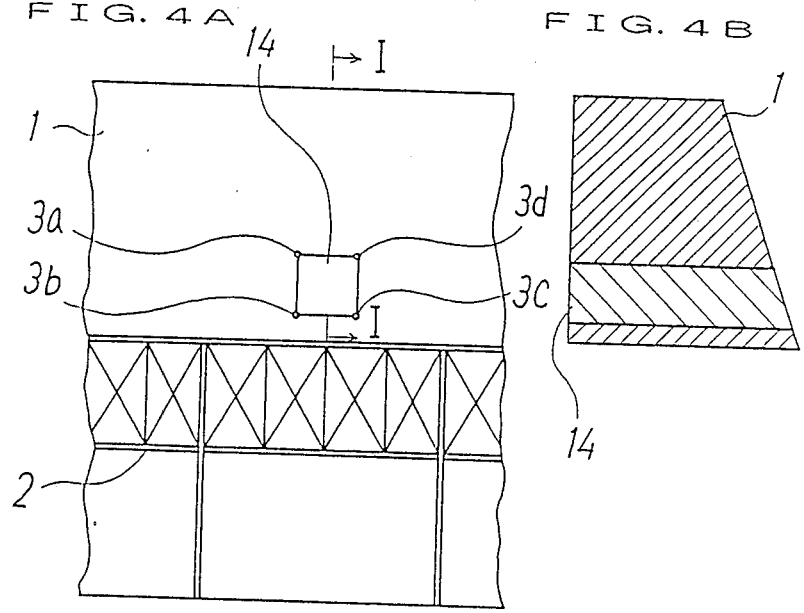
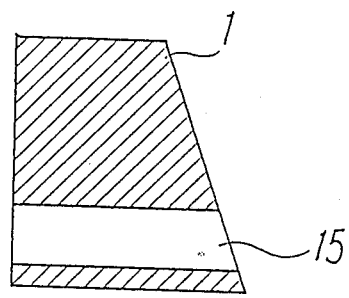

OPENING METHOD FOR REINFORCED CONCRETE WALL

BACKGROUND OF THE INVENTION

1. Field of the Invention

This invention deals with the method of making openings of considerable size on comparatively thick reinforced concrete walls (e.g. reinforced concrete barrage).

2. Description of the Prior Art

As the opening method for reinforced concrete walls, the drilling method using a blade type concrete cutter and core driller has been known.

Owing to the limitations of cutting and drilling ability originating from the structures and facilities of cutters and drillers used in the prior opening methods, it has been almost impossible to drill openings of required size in the exact required position for reinforced concrete walls (with thickness of 5 m, 10 m, 20 m or more), unless the thickness of the wall was comparatively small, say 1 m. Even if possible, a huge number of processes and money were needed, so in reality these methods could not be adopted. For example, it was impossible to drill holes of 1 or 2 m square on an existing reinforced concrete barrage with 10 to 20 m thickness so as to penetrate a steel pipe with large diameter.

As for using explosives or hydraulic breakers, the portions which is not intended to be broken also suffer from the breaking influence, so it was impossible to adopt these methods when making an exact opening in a reinforced concrete wall.

The aim of this invention is to offer a method for making the openings of required size in the required position of a comparatively thick reinforced concrete wall (e.g. reinforced concrete barrage).

SUMMARY OF THE INVENTION

The above mentioned aims are achieved by this invention. The reinforced concrete wall opening method of this invention includes the process of drilling cable penetrations at each corner of the opening domain on the reinforced concrete wall, the process of penetrating cutting cables into the adjacent cable penetrations and carrying out wire sawing with water injection, and the process of crushing out the isolated core.

Wire sawing requires winding a circulating cutting cable around the core and drawing the circulating cable using a cable drive device. This method has been used in quarries to cut out stones. Wire rope, in which beads with diamond abrasive grains and spacers such as coil springs are imbedded, and stoppers consisting of steel rings are crimped at definite intervals, is used as the cutting cable.

As the cable drive device, the following instruments are used; a cable drive pulley around which the wound cutting cable travels, an instrument moving on rails with a drive wheel having the above mentioned driving facilities, and an instrument moving on racks by means of a drive pinion.

First, in the process of drilling cable penetrations, cable penetrations are drilled so as to penetrate the reinforced concrete wall, using core drillers and so on. For example, in the case of rectangular sectioned opening, four cable penetrations in total are drilled at each corner of the rectangle. In the case of a circular opening, a polygon with many vertices approximates the circle, and cable penetrations are drilled at each corner of the polygon.

In the process of cutting down the spaces between adjacent cable penetrations, the total perimeter of the opening domain is completely cut down from surface side to back side. The polygon core surrounded by cross sections is completely separated from the surrounding wall.

If the cable drive device runs on wire sawing, the cutting cable circulates with the required tension force, and the spaces between adjacent cable penetrations, around which the cutting cable is wound, are cut down. The tension force of the cutting cable can be maintained and regulated by gradually moving the cable drive pulley backwards along rails or racks. It is also possible to gradually move other tension pulleys, while the cable drive pulley is fixed.

It is possible to employ an intermediate guide pulley to compensate for the length of the cutting cable, to guide the cable around corners and to avoid any obstructions. Therefore, a guide pulley can be installed to accommodate the position of reinforced concrete wall, the cable drive device, and any obstructions, as well as to provide for cutting orientations such as vertical cutting, horizontal cutting, and diagonal cutting. Once the cutting cable has been installed between the reinforced concrete wall and the cable drive device, all cutting operations can be remotely controlled by the cable drive device until the reinforcing bars are completely cut down, so the cutting operator need not carry out operations at the cutting site all day long as before, and it is easy to introduce automatic operations.

Travel speeds and tension force of the cutting cable are properly selected in accordance with the thickness of the reinforced concrete wall to be cut, and other cutting conditions. In ordinary situations, travel speed is set approximately between 20 and 30 m/sec, and the tension force of the tight side is set at approximately 50 to 150 kg. Under these conditions a reinforced concrete wall, complete with the internal reinforcing bars, can be cut down.

In wire sawing, water is injected for the purpose of cooling down, lubricating and cleaning the cutting cable and cutting point. As for this method, water may be supplied by a nozzle imbedded at the end of the cable penetration, or a sprinkler mounted in the cable penetration so as to not touch the cutting cable, may be used to inject water to the cutting point and to the cutting cable. In the case where a reinforced concrete wall to be drilled is immersed in water partially or totally (e.g. reinforced concrete dam body), the ambient water can be used for the water injection.

In the last process to break down the separated core, the cores will be broken down into pieces which can be brought out using explosives or hydraulic breakers, if necessary using a concrete cutter and so on. Once the core is removed, the opening is left in the concrete wall.

In using explosives or hydraulic breakers without first cutting out the core, the breaking may extend beyond the portions to be broken, while in this process no such problem takes place because the core body is already separated from the surrounding wall.

When the reinforced concrete wall is thin, it is possible to draw the separated core as a whole from the wall by pushing or pulling it. In the case of a thick wall, even if the core is sawn by wire in such a way that the core becomes tapered in depth direction, looseness in the travelling cutting cable and curvature of the cross section are inevitable, so it is very difficult if not impossible to draw a heavy and large core as a whole. In this process, partial pushing and pulling may be used in order to draw a crushed core.

As mentioned above, the opening method for reinforced concrete walls includes separation of the core from the surrounding wall using wire sawing, removal of broken core and construction of the opening.

According to this method, in the case of an opening for a thick reinforced concrete wall such as a reinforced concrete dam body, where creating such an opening has been considered to be impossible or difficult, the opening of required size can be safely and exactly drilled with a small number of steps without damaging the surrounding wall.

BRIEF DESCRIPTION OF THE DRAWING

The present invention is more clearly illustrated in the accompanying drawings, wherein FIG. 1A (resp.

FIG. 2A (resp. FIG. 2B) is the side view (resp. plan view) showing the vertical wire sawing process.

FIG. 4A (resp. FIG. 4B) is the front view (resp. I—I section) explaining the cutting state of the wire sawing process.

FIG. 5 denotes the I—I section after the breaking process in FIG. 4A.

DESCRIPTION OF THE PREFERRED EMBODIMENTS OF THE INVENTION

Figure 1A:
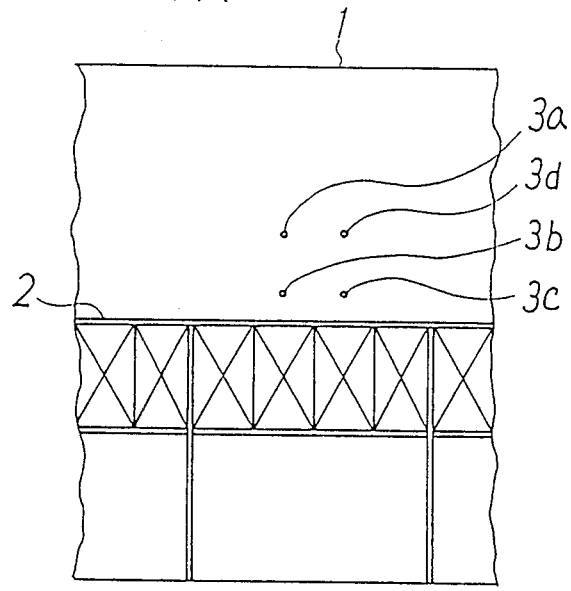
FIG. 1B) is the front view (resp. side view) explaining the drilling process for cable penetrations in the opening method for reinforced concrete walls according to this invention.
Figure 1B:
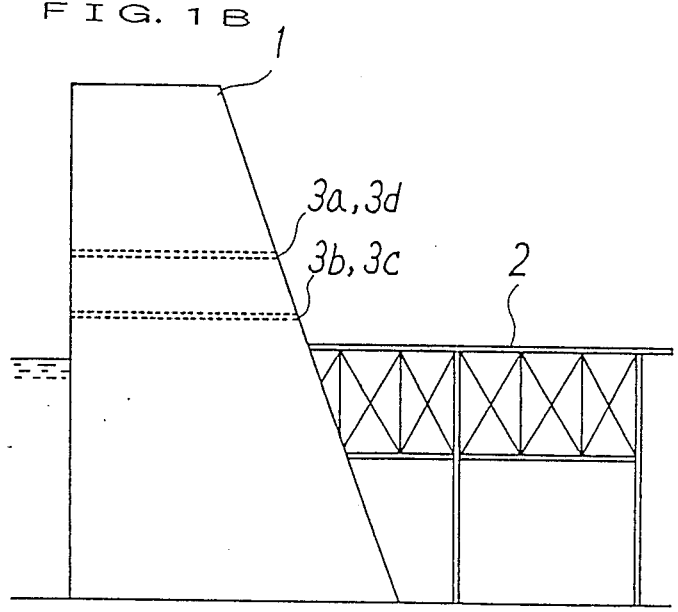

As shown in FIG. 1A and FIG. 1B, scaffold (2) is constructed on the down stream side of a reinforced concrete dam body (1) and cable penetrations 3a, 3b, 3c and 3d are drilled on each corner of the square opening domain using core drillers.

Next, as shown in FIG. 2A, FIG. 2B, FIG. 3A and FIG. 3B rail (4) is layed on scaffold (2) and the movable cable drive device (5) is set on the rail (4). The cable drive device (5) consists of the following components: pulley (6) and its rotation drive facility (not shown), tight side tension pulley (7) and loose side tension pulley (8), drive wheels (9) settled on rail (4) and their rotation drive facility (not shown).

As shown in FIG. 2A and FIG. 2B, cutting cable (10) penetrates the cable penetrations (3a and 3b) as if it winds onto the core, and is hooked on cable pulley (6) and runs inside the tight side tension pulley (7) and the loose side tension pulley (8) of the cable drive device (5). In operation the rotation drive facilities rotate the cable drive pulley (6) and drive the drive wheels (9) backward along rail (4), so the cutting cable (10) endlessly circulates under the required tension force and the space between cable penetrations (3a and 3b) is vertically cut in the reinforced concrete dam body (1). By the same operation, the space between the cable penetrations (3c and 3d) are also vertically cut.

Figure 3A:
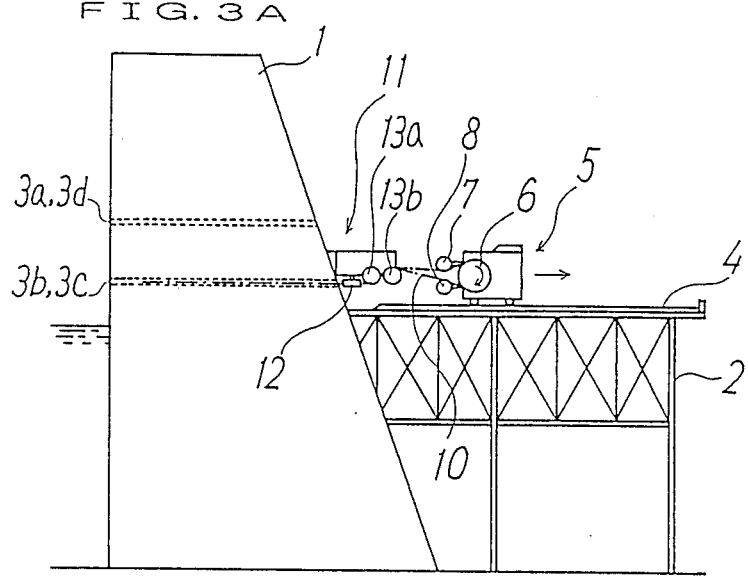
FIG. 3A (resp.
Figure 3B:
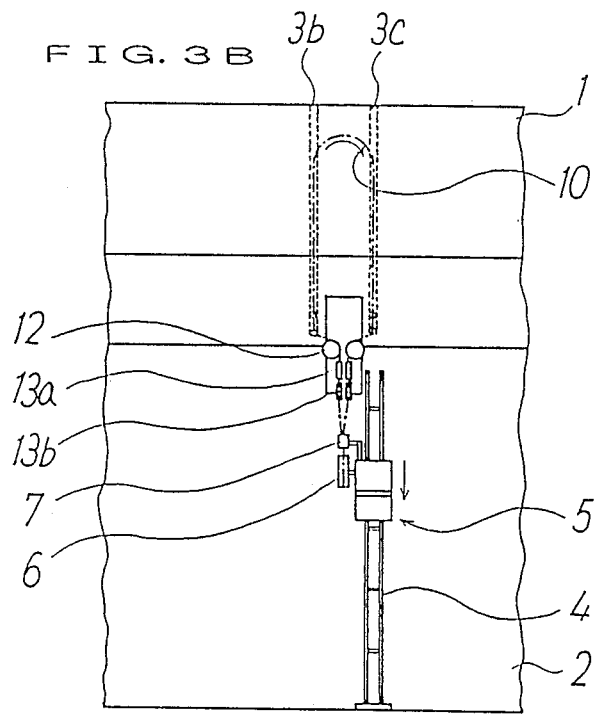
FIG. 3B) is the side view (resp. plan view) showing the horizontal sawing process.

As shown in FIG. 3A and FIG. 3B, cutting cable (10) penetrates the cable penetrations (3b and 3c), as if it winds onto the core, and is hooked on the cable pulley (6) via guide pulley board (11), and the inside of tight side tension pulley (7) and loose side tension pulley (8) of the cable drive device (5). This guide pulley board (11) consists of a pair of crosswise guide pulleys (12) and two pairs of lengthwise guide pulleys (13a and 13b). This pulley board is anchored on the reinforced concrete dam body (1) during the wire sawing in such way that it may be removed after its use.

In this situation, the space between cable penetrations (3b and 3c) in the reinforced concrete dam body (1) is horizontally cut by operating the cable drive device (5) to cause the cutting cable (10) to circulate endlessly with the required tension force. The space between cable penetrations (3a and 3d) is horizontally cut in the same manner. The guide pulley board (11) makes the distance in the cutting cable (10) going through cable penetrations (3b and 3c, or 3a and 3d) narrower and leads the cable to the tight side tension pulley (7) and loose side tension pulley (8) of the cable drive device (5) through two adjacent lengthwise guide pulleys (13a and 13b).

In the vertical and horizontal cutting, water for cooling and lubrication is supplied to the penetrations 3a, 3b, 3c, 3d and to other cut portions if necessary (not shown).

By wire sawing the space between cable penetrations 3a, 3b, 3c and 3d, the core surrounded by four cutting planes is completely isolated from the reinforced concrete dam body (1), as shown in FIG. 4A and FIG. 4B.

The core (14) is gradually removed and broken by explosives and hydraulic breakers, eventually forming the opening (15) as shown in the section of FIG. 5.

This invention is not limited to this particular example. For example, the cutting order between each cable penetration can be varied according to the situation. The above execution is not more than an example. It is possible to move the cable drive device along a direction parallel to the reinforced concrete wall or a direction diagonal to the wall. The cable drive device may be set on the reinforced concrete wall or on something other. Other tensioner or feeder such as a drive pinion and rack may be adopted as the cable drive facility. As a guide pulley to freely lead and rotate the cutting cable, several sets of guide pulleys having rotation surfaces in the required direction may be used instead of using the guide pulley as a unit. Required numbers of guide pulley boards having differently combined guide pulleys may be used by setting them on the reinforced concrete wall or on the road.

What I claim is:

1. A method for creating an opening through a reinforced concrete wall, said opening being shaped as a polygon, comprising:

drilling cable penetrations through the concrete wall at each vertice of said polygon;

for each pair of cable penetrations located at adjacent vertices of the polygon, placing a cutting cable through the pair of cable penetrations and circulating said cutting cable so as to cut between the cable penetrations while injecting water against the cutting cable, to thereby separate a polygonal-shaped core; and breaking up and removing said core so as to leave said opening in the concrete wall.

2. A method for creating an opening through a reinforced concrete wall, said opening being shaped as a rectangle having two vertical legs and two horizontal legs, comprising:

drilling cable penetrations through the concrete wall at each vertice of said rectangle;

placing a cutting cable through the pair of cable penetrations, for each pair of cable penetrations located at adjacent vertices of the rectangle;

circulating said endless cutting cable so as to cut along said vertical and said horizontal legs between the cable penetrations, to thereby separate a rectangular-shaped core;

guiding said cutting cable by two vertically-disposed tension pulleys attached to a cable drive device when cutting along said vertical legs;

guiding said cutting cable by two horizontally-disposed tension pulleys attached to a cable drive device when cutting along said horizontal legs;

injecting water against the cutting cable while circulating said cutting cable; and breaking up and removing said core so as to leave said opening in the concrete wall.

* * * * *